Aug. 11, 1936.   J. H. E. FRANCIS   2,050,942
METHOD OF SECURING BUSHINGS TO SHEET METAL
DRUMS, KEGS, AND LIKE RECEPTACLES
Filed Jan. 17, 1935
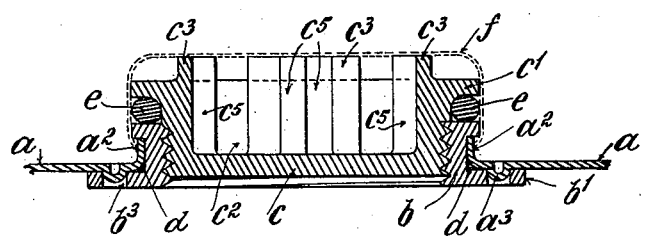
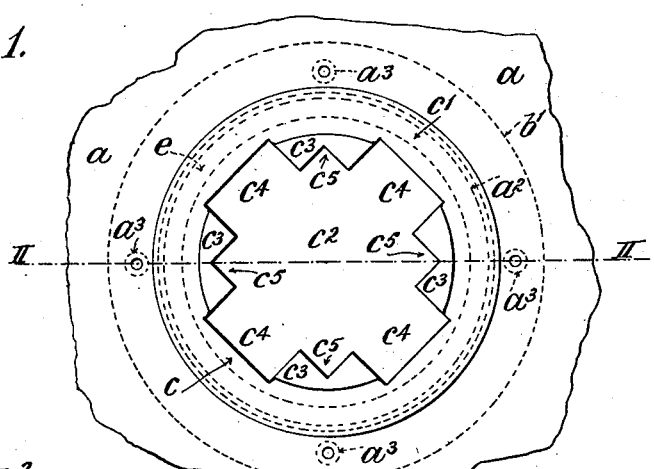
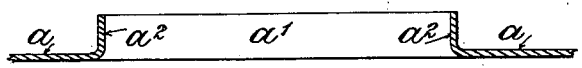
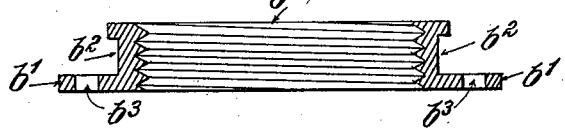
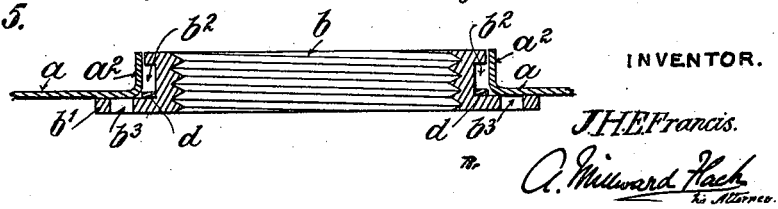
INVENTOR.
J.H.E.Francis.

Patented Aug. 11, 1936

2,050,942

UNITED STATES PATENT OFFICE 2,050,942

METHOD OF SECURING BUSHINGS TO SHEET METAL DRUMS, KEGS, AND LIKE RECEPTACLES

James Henry Edward Francis, London, England

Application January 17, 1935, Serial No. 2,227
In Great Britain April 25, 1934

2 Claims. (Cl. 29—148.2)

This invention relates to a method of securing bushings to sheet metal drums, kegs and like receptacles. Such a receptacle, particularly when adapted to contain oil, is usually provided with a filling and discharging opening either in the head or in the wall of the drum or keg near the bottom and to allow for drawing off its contents. This opening is normally closed by a screw plug which is removed to allow for the insertion of the screw spigot of a tap, and in order to secure a screw socket or bushing for the screw plug within the opening in the drum or keg various constructions have been employed to ensure a liquid tight joint between the parts.

Now the objects of the present invention are to lessen the cost of manufacturing such types of closure, whilst at the same time obtaining a secure liquid tight joint between the screwed socket and the drum and the screwed plug and the socket.

The present invention consists in forming an outwardly projecting flange in the edge of an opening in the drum, forming an internally screw threaded socket with an external diameter equal or approximately equal to that of the opening in the drum, forming a projecting flange on the lower edge of the socket and a recess below the top edge of the socket, inserting the socket from the inner side of the drum into the flanged opening with or without an interposed packing ring or gasket, then pressing the flanged edge of the drum inwardly into intimate contact with the recess in the socket whereby the edge of the drum is brought into a position below the upper edge of the socket and providing means for preventing relative movement between the drum and the socket.

This invention will be now more particularly described making reference to the accompanying drawing, in which:—

Fig. 1 is a view in plan of a closure embodying the present invention.

Fig. 2 is a view in section on line II—II of Fig. 1.

Fig. 3 is a sectional view in side elevation of the flanged opening in the wall of the drum.

Fig. 4 is a similar view of the socket, and

Fig. 5 is a similar view showing the socket inserted in the flanged opening before the latter is operated upon to embrace the socket.

Throughout the views similar parts are marked with like letters of reference.

The wall $a$ of a sheet metal drum is formed with a circular hole $a^1$. The edge of this hole is turned up outwardly to form an upstanding cylindrical flange $a^2$. A socket $b$ internally screw threaded to receive a correspondingly threaded plug $c$, has an external diameter equal to or approximating to the internal diameter of the cylindrical flange $a^2$, as shown in Figs. 3-5.

The socket $b$ is furnished with a flange $b^1$ and an exterior annular recess $b^2$. This socket $b$ is then inserted from the inner side of the drum into the cylindrical flange $a^2$, see Fig. 5, a packing ring $d$ being first interposed between the parts as shown. Pressure is now applied in any well known manner to cause the metal constituting the flange $a^2$ to move inwardly into intimate contact with the recess $b^2$ of the socket, whereby the top edge of the flange $a^2$ is brought into a position below the upper edge of the socket $b$, as shown in Fig. 2. The flange $a^2$ is preferably of such a depth that when distorted by radial pressure to tightly embrace the recess $b^2$ it entirely fills said recess in a vertical direction. The recess $b^2$ instead of being rectangular in cross section, as shown, may be semi-circular. It will be seen that when the parts are thus engaged, the packing ring $d$ will be distorted, as shown in Fig. 2, thus making a liquid tight joint between the parts.

Any means may be provided for preventing relative movement between the drum and the socket $b$, but the preferred arrangement is to form holes, for instance say four holes $b^3$, in the flange $b^1$ of the socket with which engage bosses $a^3$ formed in the wall $a$ of the drum. These bosses $a^3$ may be formed by punching out the wall of the drum either after the flange $a^2$ has been swaged into the recess $b^2$, or the bosses $a^3$ may be formed on the inner surface of the wall before such operation.

The plug $c$—preferably formed by die casting—is formed with a recess below the flange $c^1$ adapted to receive a washer or packing ring $e$, so that when the plug $c$ is screwed home in the socket $b$, the washer or packing ring $e$ is compressed between the top edge of the socket $b$ and the flange $c^1$ of the plug, as shown in Fig. 2. The plug $c$ is preferably formed with a hollow or recess $c^2$ in its head extending to near the bottom of the plug with lugs $c^3$ extending above the surface of the head and is so shaped as to enable the plug to be readily removed with a bar or key of practically any shape. For instance, the hollow or recess $c^2$ is shaped in plan to comprise a cross shaped recess $c^5$ super-imposed thereon. The walls of the square shaped recess $c^5$ and a portion of the walls constituting the cross shaped recess $c^4$ are extended upwardly beyond the surface of the head of the plug to form the projecting lugs $c^3$. These lugs $c^3$ may be drilled with transverse holes to receive a sealing wire which is passed through one of said holes and threaded through a loop or tag attached to the drum or key and the ends of the wire fastened together by a lead or like seal in known manner.

A relatively thin sheet metal cap $f$, shown in dotted lines in Fig. 2, may be placed over the plug $c$ and secured in position by beading its edge into the recess formed by the inturned flange $a^3$ and the top edge of the socket $b$.

I declare that what I claim and desire to secure by Letters Patent is:—

1. The method of securing a bushing to a sheet metal drum consisting in forming an outwardly projecting flange in the edge of an opening in the drum, forming an internally screw threaded bushing adapted to receive a screw threaded plug, the said bushing being of an external diameter approximately equal to that of the opening in the drum and having a projecting flange on its lower edge and an exterior recess below its top edge, inserting the bushing from the inner side of the drum into the flanged opening in the drum with an interposed gasket, then pressing the flanged edge of the drum inwardly into intimate contact with the recess in the bushing whereby the edge of the drum flange is brought into a position below the upper edge of the bushing and providing means for preventing relative movement between the drum and the bushing, as set forth.

2. The method of securing a bushing to a sheet metal drum consisting in forming an outwardly projecting flange in the edge of an opening in the drum, forming an internally screw threaded bushing adapted to receive a screw threaded plug, the said bushing being of an external diameter approximating to that of the opening in the drum and having a projecting flange on its lower edge and an exterior recess below its top edge, inserting the bushing from the inner side of the drum into the flanged opening in the drum with an interposed gasket, pressing the flanged edge of the drum inwardly into intimate contact with the recess in the bushing whereby the edge of the drum flange is brought into a position below the upper edge of the bushing and providing means for preventing relative movement between the drum and the bushing consisting in forming holes in the flange of the bushing and inwardly projecting bosses in the wall of the drum above the flange of the bushing and causing the basses to engage said holes, as set forth.

JAMES HENRY EDWARD FRANCIS.